April 9, 1946. F. E. GEPHART 2,397,959
PORTABLE CONVEYER
Filed March 30, 1942 2 Sheets-Sheet 1

Inventor
Forman E. Gephart
F. B. Walker
Attorney

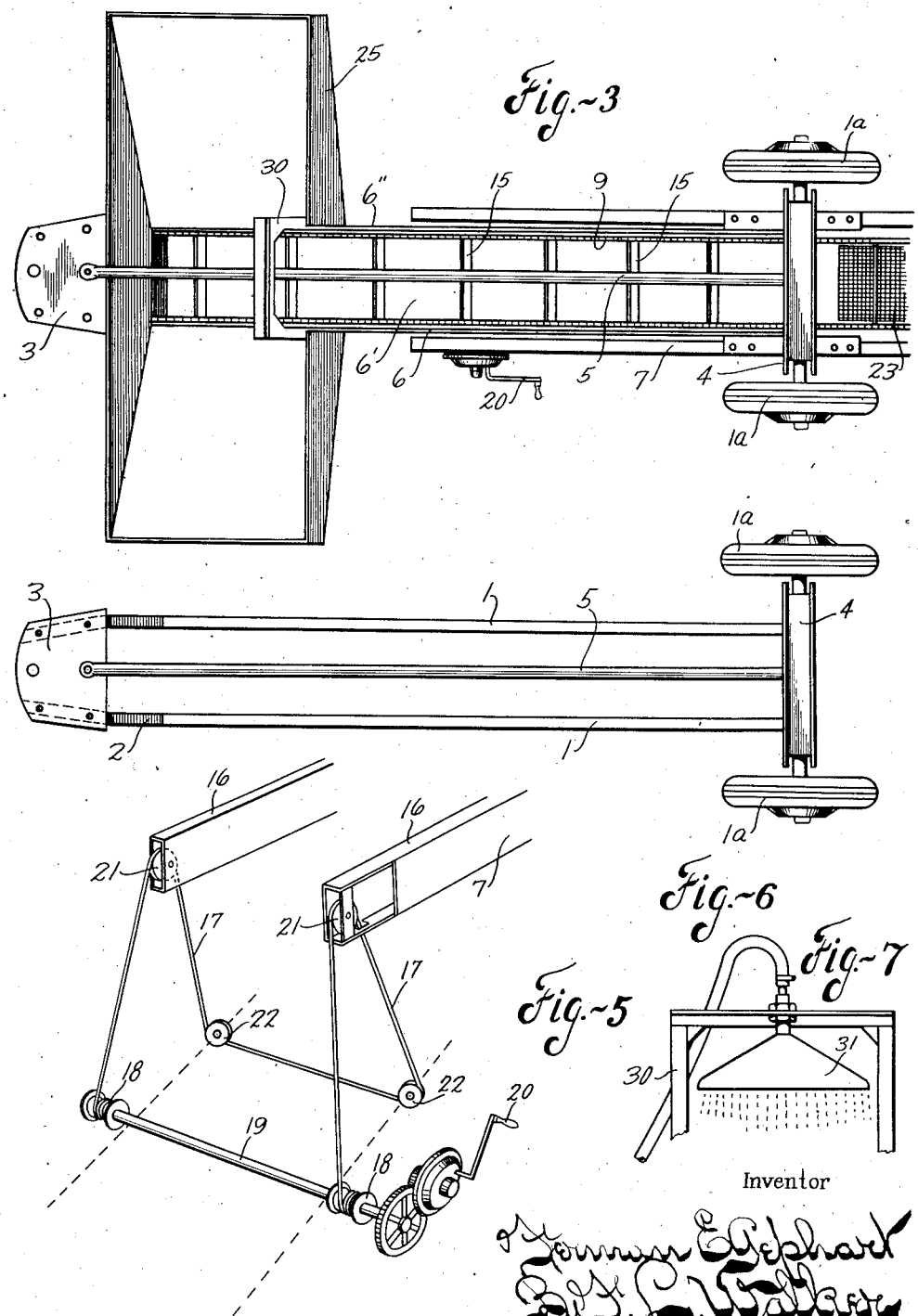

Patented Apr. 9, 1946

2,397,959

UNITED STATES PATENT OFFICE 2,397,959

PORTABLE CONVEYER

Ferman E. Gephart, Farmersville, Ohio

Application March 30, 1942, Serial No. 436,726

9 Claims. (Cl. 134—131)

This invention pertains to power driven endless conveyers of the loading machine type and more particularly to a portable trailer unit having a vertically swinging adjustment.

The present apparatus is especially adapted for discharging coal, grain, or other commodities, or for handling and distributing road building and construction materials and is adapted to be transported from place to place by being hitched to a truck or tractor. The apparatus is especially adapted to discharge through a restricted space or window into a bin or onto a pile at high or low level, and in adapted to receive the material from a hopper removably mounted thereon. By detachment of the hopper the conveyer may be positioned beneath the discharge outlet of a railway car, a grain bin, or gravel dump for direct reception of material.

The object of the invention is to provide a loading and unloading apparatus of the character mentioned which may not only be economically constructed and operated, but which will be more efficient in use, automatic in action, uniform in operation, having relatively few operating parts, and be unlikely to get out of repair.

A further and important object of the invention is to provide a portable conveyer apparatus which is of compact form and stable construction, of comparatively light weight and adapted for convenient trailer transportation behind a truck or other vehicle.

A further object of the invention is to provide such portable conveyer of flexible construction and readily adjustable to enable delivery at different heights whereby the discharge end of the conveyer may be introduced directly into a window of a basement for discharge of coal or through an elevated opening into a granary or storage crib.

A further object of the invention is to provide in association with such apparatus a cleaning or screening unit over which the conveyed material is advanced, and a spray device by which the passing material may be uniformly treated during advancement.

A further object of the invention is to provide a traveling conveyer or loading apparatus having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a perspective view of a portable loading machine or conveyer embodying the present invention.

Fig. 3 is a top plan view of the portion of the apparatus illustrated in Fig. 2.

Fig. 5 is a detail perspective view of the adjusting means for the extension conveyer.

Fig. 6 is a detail plan view of the main frame.

Fig. 7 is a detail view showing the spray nozzle.

Like parts are indicated by similar characters of reference throughout the several views.

Figure 1:
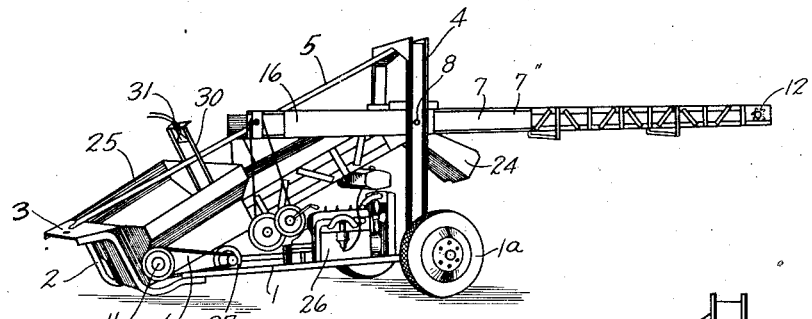
Figure 2:
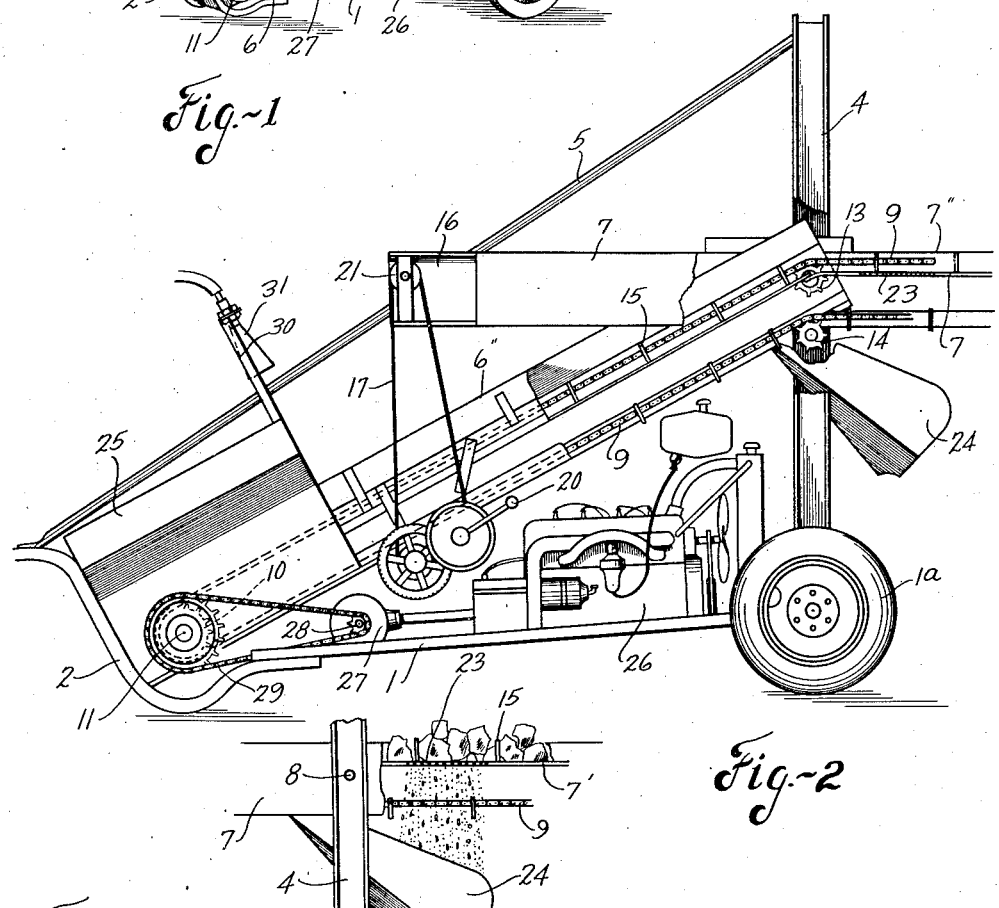
Fig. 2 is a side elevation, of a portion of the assembled apparatus, partly broken away.

The operative parts of the present apparatus are mounted on a unitary substantially truncated triangular chassis including relatively spaced longitudinal frame bars 1—1 upturned at their extremities at 2 and joined by a draft head 3 by which the frame may be hitched as a trailer to a tractor or other motive vehicle. At the rear end of the frame bars 1 is an upstanding arch 4 the top of which is connected with the draft head 3 by a diagonal brace rod 5. Mounted on the rear end of the frame at the juncture of the chassis bars 1 and the upright arch 4 are carrying wheels 1a.

Fixedly supported upon this frame is an inclined elevator chute 6 comprising an imperforate bottom 6' and upstanding side walls 6''. Pivotally mounted coincident with the upper end of the inclined conveyer chute 6 is a cantilever chute extension 7 thereof; also comprising a bottom 7' and side walls 7''. The conveyer extension 7 is pivoted on a transverse shaft 8 having bearings in the arch 4 for vertical swinging movement to differently inclined positions by which the distant discharge end thereof may be raised above or depressed below the upper end of the initial conveyer section 6. Disposed for travel motion relative to the conveyer sections 6 and 7 is an endless chain belt 9 which is common to both sections. The traveling chain belt 9 passes about a drive sprocket 10 upon the power shaft 1 at the lower forward end of the initial conveyer section 6 and about an idler sprocket 12 at the extreme end of the cantilever section 7 of the conveyer. Medially the operating and return reaches of the chain belt pass over idler sprockets 13 and 14. The idler sprocket 13 is upon the pivotal shaft 8 so that the active length of the conveyer chain maintains constant relation with the conveyer sections 6 and 7 throughout the range of angular adjustment thereof. Two relatively spaced chains 9 are employed, which are interconnected at spaced intervals by transverse scraper bars 15 which ride upon the conveyer chute bottoms 6' and 7' to move the material thereover. The cantilever chute 7 is provided with arms 16 coincident with each side thereof and extending in overlying spaced relation relative to the elevator chute 6. The arms are connected by a cable 17 with reels 18 upon a winding shaft 19 mounted on the under side of the initial chute 6. The shaft 19 is gear driven by a hand crank 20 and held in adjusted position by a suitable detent. The cable 17 has both its ends attached to the respective reels 18 and passes thence over sheaves or pulleys 21 in the ends of the arms 16.

The bight of the cable passes transversely under the chute 6 through idler sheaves or pulleys 22 mounted on the chute. By rotating the shaft 19 to retrieve or pay out the cable 17 the cantilever chute 7 may be raised or lowered according to the desired level of discharge.

Figure 4:
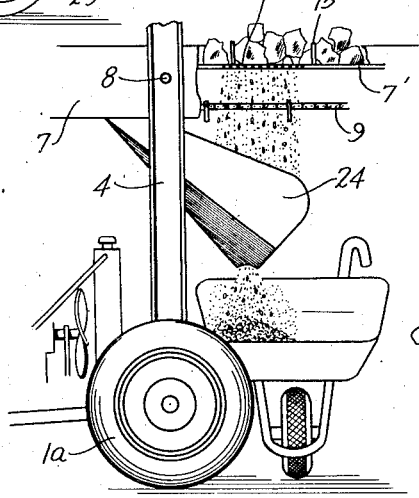
Fig. 4 is a detail view of the cleaning or screening feature.

In the bottom 7' of the cantilever chute 7 there is inset an interchangeable screen section 23 over which the material being conveyed is drawn by the scraper bars 15 and chains 9. In the event the material is coal, gravel, or crushed stone for road building purposes or the like, the fine materials are sifted out of the mass and falling through the screen into a hopper or chute 24 as shown in Fig. 4 are discharged from the apparatus.

When the loader is used for other materials or when the fine and coarse materials are not to be separated, the screen section 23 may be replaced by an imperforate section of like shape and size, or the screen may be covered by such a section. Likewise the screen section 23 may be interchanged with other screens of different capacity or degree of fineness.

The apparatus is such that the lower end of the initial chute 6 may be thrust beneath a loaded railway car or beneath the discharge spout of a bin or storage tank to receive the material which is elevated through the chute 6 and carried to a distant truck or other receiver by the continuing, adjustable chute 7. For other conditions of use a hopper 25 is removably positioned upon the lower forward end of the inclined chute or elevator 6 into which material may be dumped from a truck or shoveled from a car. When filling a basement coal bin the free end of the cantilever chute 7 may be lowered and thrust through the charging door or window to the bin. If grain is being stored in a crib or granary, the free end of the cantilever chute is elevated and thrust over the top of the crib or granary wall or through an elevated window.

The conveyer is driven from a motor 26 located on the chassis bars 1 beneath the primary elevator chute 6. This power unit may be an electric motor when electric current is available, but in the present instance an explosive or hydrocarbon engine is shown. Power from the engine 26 is transmitted through the variable speed transmission unit 27 to the drive shaft 28. A chain drive belt 29 delivers the power from the drive shaft 28 to the power shaft 11 which carries the conveyer drive sprocket 10.

When it is desired to transport the apparatus the draft head 3 is coupled to a truck or other tractor vehicle by any suitable trailer hitch. In this manner a truck loaded with coal or grain to be delivered may serve to draw to the place of delivery the present conveyer unit by which the contents of the truck are later delivered into a bin or crib. In such case the truck load of material is unloaded into the hopper 25. However, for loading the truck preparatory to delivery of the commodity, the hopper is removed and the lower end of the elevator chute 6 is thrust beneath the supply car or storage bin to receive material directly therefrom while the free end of the cantilever chute section is positioned in overhanging relation with the truck.

Positioned at the rear end of the hopper 25 is an upright arch 30 of less height than the arch 4, upon which is mounted a spray head 31. The spray head is connected by a hose or supply conduit with a source of spray material for delivery onto the passing material in the elevator chute 6.

By this means coal may be oil sprayed or water sprayed to lay the dust, or in the case of grain delivery the passing grain may be fumigated. The spraying of water, oil or fumigating material on the passing material while on the conveyer assures that every portion of the conveyed material is reached by the spray material and such spray fluid and that the latter is uniformly delivered. The particular shape and construction of the spray head is immaterial, but for grain fumigation it is desirable, although not essential, that the spray head be of approximately the width of the conveyer and that it be positioned low in the arch 30 above the path of traveling grain.

For water and oil spray the spray head may be located at higher elevation and the spread of the spray stream relied upon for distribution.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specifice as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A portable conveyer and loading machine, including relatively spaced longitudinal frame bars upturned at their ends, a hitch head interconnecting the upturned ends of said bars for attachment to a draft vehicle, an upstanding arch interconnecting the frame bars at their ends opposite the hitch head, a diagonal brace rod disposed in a vertical medial longitudinal plane of the frame interconnecting the arch and hitch head into a stable structure, carrying wheels positioned on the frame, in proximate relation with the juncture of the upstanding arch and the longitudinal frame bars, a traveling conveyer mechanism mounted on said frame including a stationary inclined section mounted on the frame with its depressed end in proximate relation with the upturned ends of the frame bars and its elevated end fixedly secured at a mid-height point to said upstanding arch, an oscillatory continuing section of the traveling conveyer pivoted to the upstanding arch in proximate relation with the end of the stationary conveyer section and projecting therebeyond in variable angular relation thereto, adjusting devices for changing the angularity of the stationary and oscillatory sections of the conveyer and an actuating motor also on said frame and operatively connected with the traveling conveyer for driving the latter.

2. A portable conveyer or loading machine including a normally inclined main frame, one end of which is adapted to rest upon the ground when in use, carrying wheels supporting the opposite end of the frame in elevated position, and upon which the frame is transportable, a traveling conveyer mounted on the main frame in elevated position wholly above ground level including a relatively fixed inclined chute and a vertically swinging cantilever chute communicating with the upper end of the fixed inclined chute, extensions carried by the cantilever chute in overlying spaced relation with the fixed chute by means of which the cantilever chute is maintained in adjusted position, a motor mounted on the main frame beneath said fixed inclined chute, and a traveling conveyer belt common to the chutes.

3. A portable conveyer including a main frame, a conveyer comprising a relatively fixed inclined chute and a vertically swinging cantilever chute pivoted to the main frame contiguous to the upper end of the fixed chute, means for adjusting the latter chute, a traveling conveyer common to the chutes, a hopper from which material is supplied to the conveyer, a support overhanging the relatively fixed chute and a spray head carried by the support and directing its discharge upon material being conveyed approximately as it leaves the hopper.

4. A portable conveyer frame including a pair of substantially parallel inclined frame bars adapted to rest at one end upon the ground when the conveyer is in use, carrying wheels supporting the opposite ends of said bars in elevated position, the lower ends of the inclined frame bars being upturned, a draft head carried by the upturned ends of the frame bars in elevated relation thereabove for engagement with a traction vehicle, an upstanding arch carried by the upper ends of the inclined frame bars and a diagonal tie rod in a medial vertical plane between the frame bars interconnecting the draft head with the top of the arch.

5. A portable conveyer including an inclined supporting frame one end of which is adapted to rest upon the ground when in operation, an upturned extremity thereon, carrying wheels supporting the opposite end of the frame in elevated position, a draft head carried by the upturned extension of the inclined frame for engagement with a traction vehicle to enable transportation of the conveyer, an inclined conveyer chute mounted in fixed relation on the frame, a cantilever chute pivoted adjacent the end of the inclined chute for vertical swinging adjustment, arms carried by the cantilever chute in elevated relation above the inclined chute partially counterbalancing the unsupported weight of the cantilever chute, means for adjusting the cantilever chute, an endless traveling conveyer common to the chutes, and a motor mounted on the main frame for driving the conveyer.

6. A portable conveyer, including a chassis comprising a pair of relatively spaced longitudinal frame bars upturned at their ends and adapted to rest upon the ground adjacent to their upturned ends, a pair of carrying wheels supporting the frame bars at their ends opposite said upturned ends, a transverse tie member interconnecting the extremities of the upturned portions of the frame bars and forming an elevated draft connection for the apparatus, an upstanding arch connecting the opposite ends of the frame members substantially in the axial plane of the carrying wheels, an elongated inclined brace rod interconnecting the top of the arch with the transverse tie member which connects the upturned ends of the frame bars and disposed in a medial longitudinal plane intermediate the frame bars, an inclined traveling conveyer section stationarily mounted upon the chassis with its lower end contiguous to the inner sides of the upturned ends of the frame bars, and its elevated end fixedly supported on said arch in elevated position above the carrying wheels, a hopper supported upon the longitudinal frame bars contiguous to their upturned ends with the interior of which hopper the depressed end of the conveyer communicates, a continuing oscillatory cantilever section of the traveling conveyer pivoted to the upstanding arch contiguous to the elevated end of the stationary section of the traveling conveyer and receiving material discharged therefrom, parallel cantilever arms secured to the oscillatory traveling conveyer section and extending beyond the supporting arch in elevated relation with the stationary conveyer section, by vertical adjustment of which the angular relation of the oscillatory conveyer section is changed relative to the stationary conveyer section, an adjusting device for changing the inclination of said arms to effect variation of the angular relation of the stationary and oscillatory sections of the conveyer, and means for applying driving power to the respective sections of the traveling conveyer simultaneously in varying positions of angular adjustment thereof.

7. A portable conveyer, including a chassis, an inclined conveyer chute section mounted in relatively fixed relation on the chassis, an oscillatory conveyer chute section pivotally attached to the chassis and receiving the material discharged from the relatively fixed chute section, an operator arm carried by the adjustable chute section in elevated relation above the relatively fixed conveyer chute, adjusting means attached to the arm for tilting the oscillatory conveyer chute to different angular positions relative to the relatively fixed chute, power transmission means for driving the conveyer mechanism, and a draft hitch elevated above the lower end of the relatively fixed inclined conveyer chute.

8. A portable elevator wherein an upwardly inclined conveyer mounted upon a traveling carriage discharges into a continuing relatively adjustable cantilever conveyer also mounted on the traveling carriage contiguous to the upper end of the upwardly inclined conveyer, including adjusting means for the cantilever conveyer, rearwardly projecting arms carried by the cantilever conveyer with which the adjusting means is associated, a hopper located at the lower end of the inclined conveyer from which the contents thereof are carried upwardly by the inclined conveyer and discharged thence by the continuing cantilever conveyer, a spray device mounted in elevated relation relative to the inclined conveyer and discharging spray liquid onto material conveyed thereby as it leaves the hopper at the initiation of its upwardly inclined path of travel upon the inclined conveyer.

9. A portable elevator wherein an upwardly inclined conveyer mounted upon a traveling carriage discharges into a continuing relatively adjustable cantilever conveyer also mounted on the traveling carriage contiguous to the upper end of the upwardly inclined conveyer, upon which materials are advanced in an upwardly inclined direction, adjusting means for the cantilever conveyer carried thereby in overlying spaced relation relative to the upwardly inclined conveyer, and a spray device mounted to discharge upon the contents of the upwardly inclined conveyer at the lower end thereof as such material begins its upward travel movement.

FERMAN E. GEPHART.